(12) United States Patent
Brück et al.

(10) Patent No.: US 7,276,211 B2
(45) Date of Patent: Oct. 2, 2007

(54) PROCESS FOR PRODUCING A ONE-PIECE, STRUCTURED METAL FOIL HAVING A HOLE, METAL FOIL AND HONEYCOMB BODY

(75) Inventors: Rolf Brück, Bergisch Gladbach (DE); Jörg Zimmermann, Bad Münstereifel (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 634 days.

(21) Appl. No.: 10/680,380

(22) Filed: Oct. 6, 2003

(65) Prior Publication Data

US 2004/0064927 A1 Apr. 8, 2004

Related U.S. Application Data

(63) Continuation of application No. PCT/EP02/03481, filed on Mar. 28, 2002.

(30) Foreign Application Priority Data

Apr. 6, 2001 (DE) .................... 101 17 086

(51) Int. Cl.
*B01D 50/00* (2006.01)
*B21D 39/00* (2006.01)
(52) U.S. Cl. ............... 422/171; 422/176; 422/177; 422/180; 422/181; 428/593; 428/603; 428/604; 72/379.6; 29/890
(58) Field of Classification Search .......... 422/180, 422/181, 176, 177, 171; 428/593, 603, 604; 502/527.9, 527.22; 72/379.2, 379.6; 29/890
See application file for complete search history.

(56) References Cited

U.S. PATENT DOCUMENTS

| | | | |
|---|---|---|---|
| 5,215,724 A | * | 6/1993 | Haerle ................. 422/180 |
| 5,795,658 A | * | 8/1998 | Bode et al. ........... 428/593 |
| 5,809,776 A | | 9/1998 | Holtermann et al. |
| 5,902,558 A | * | 5/1999 | Maus et al. ........... 422/181 |
| 5,939,212 A | * | 8/1999 | Ragland et al. ....... 428/594 |
| 6,277,784 B1 | * | 8/2001 | Kruse .................. 502/439 |

(Continued)

FOREIGN PATENT DOCUMENTS

| | | |
|---|---|---|
| DE | 40 29 749 A1 | 3/1992 |
| DE | 93 15 010.5 U1 | 5/1994 |
| DE | 197 24 263 A1 | 12/1998 |

(Continued)

*Primary Examiner*—N. Bhat
(74) *Attorney, Agent, or Firm*—Laurence A. Greenberg; Werner H. Stemer; Ralph E. Locher

(57) ABSTRACT

A process for producing a one-piece, structured metal sheet having an interior with a hole, provides a predetermined, curved outer contour and inner contour that delimits the hole. A smooth, shaped blank is produced, having an outer edge substantially concentrically outside the predetermined outer contour and an inner edge substantially concentrically outside the predetermined inner contour. A structure, which preferably has formations running substantially radially, is then stamped into the metal sheet so that the sheet is formed with an approximately uniform degree of deformation in an inner boundary region and an outer boundary region. A metal sheet for a catalyst carrier body has an interior hole, an outer contour, an inner contour delimiting the hole and a structure with formations running approximately in radial direction. The metal sheet is produced in one piece and in particular is seamless.

7 Claims, 3 Drawing Sheets

U.S. PATENT DOCUMENTS

| | | | |
|---|---|---|---|
| 6,660,403 B2 * | 12/2003 | Ragland et al. | 428/594 |
| 7,055,314 B2 * | 6/2006 | Treiber | 60/297 |
| 7,083,860 B2 * | 8/2006 | Maus et al. | 428/593 |
| 2005/0095180 A1 * | 5/2005 | Wieres | 422/180 |

FOREIGN PATENT DOCUMENTS

| | | |
|---|---|---|
| WO | 96/09892 | 4/1996 |
| WO | 96/09893 | 4/1996 |

* cited by examiner

PROCESS FOR PRODUCING A ONE-PIECE, STRUCTURED METAL FOIL HAVING A HOLE, METAL FOIL AND HONEYCOMB BODY

CROSS-REFERENCE TO RELATED APPLICATION

This application is a continuation of copending International Application No. PCT/EP02/03481, filed Mar. 28, 2002, which designated the United States and was not published in English.

BACKGROUND OF THE INVENTION

Field of the Invention

The invention relates to a process for producing a one-piece, structured metal foil having an interior hole, a predetermined, curved outer contour and an inner contour delimiting the hole. The invention also relates to a metal foil of that type. The invention furthermore relates to a honeycomb body, in particular for purifying an exhaust gas from an internal combustion engine, which includes a central passage having an incoming flow axis, and a multiplicity of metal foils which are at least partially structured, defining passages through which an exhaust gas can flow.

A honeycomb body of that type is known, for example, from European Patent Application 0 783 370 A1, published as International Publication No. WO 96/09893, corresponding to U.S. Pat. No. 5,902,558. That document describes a honeycomb body for catalytic conversion of exhaust gases in an exhaust system of an internal combustion engine, which has a multiplicity of passages, each passage opening out into a central passage at one end. The passages run outward in the shape of an arc from the central passage and are delimited by disks bearing against one another. In that case, at least some of the disks have a macrostructure forming a lateral boundary of the passages. The arcuate configuration of the passages causes the exhaust gas flowing through the honeycomb body to be very strongly diverted, which may give rise to an undesirable pressure drop.

Accordingly, in order to avoid a pressure drop of that nature, it is desirable to form substantially straight passages leading radially outward from the central passage. By way of example, it is known to produce metal foils in disk form with a hole in the center and radially outwardly directed passages, in which a plurality of segments resembling pieces of cake are assembled to form a disk-like metal foil of that type. Dividing the metal foil into a plurality of segments brings about a number of problems, in particular with regard to the production of a honeycomb body of that type, since the individual segments have to be oriented with respect to one another. That means that the honeycomb body can only be produced in large series with considerable technical outlay.

Despite those known problems of fluid dynamics, it has not heretofore been impossible to produce a one-piece metal foil which has a structure that is suitable for forming substantially straight passages running radially outward.

SUMMARY OF THE INVENTION

It is accordingly an object of the invention to provide a process for producing a one-piece, a structured, metal foil having an interior hole and a structure including substantially radially running formations, a metal foil which in particular simplifies the production of honeycomb bodies through which gas can flow in a radial direction and a honeycomb body which can be produced at low cost and is distinguished by a particularly low pressure drop in a gas stream flowing therethrough, that overcome the hereinafore-mentioned disadvantages of the heretofore-known processes and products of this general type.

With the foregoing and other objects in view there is provided, in accordance with the invention, a process for producing a one-piece, structured metal foil having an interior hole, a predetermined, curved outer contour and an inner contour delimiting the hole. The process comprises the steps of initially providing a smooth blank having an outer edge disposed substantially concentrically outside the outer contour to be produced and having an inner edge disposed substantially concentrically outside the inner contour to be produced. Then a structure, preferably having substantially radially running formations, is imparted to the smooth blank to form the metal foil by processing the smooth blank with an approximately uniform degree of deformation in an inner boundary region and an outer boundary region.

The degree of deformation in this context refers to a ratio of the dimensions of an imaginary partial region of the metal foil before and after the deformation has taken place. The degree of deformation can be determined, for example, by applying a measuring grid or unit figures which include rectangles and/or circles to the blank, these in each case having a predeterminable length, width or radius. After the metal foil has undergone the deformation process, it is possible to read off the deformations of the metal foil on the basis of the distortion of the measuring grid or figures being applied. If they are circles with a diameter $d_0$, the original circles, after the deformation, form, for example, an ellipse with a minimum diameter $b_1$ and a maximum diameter $l_1$. The degrees of deformation can then initially be measured in two directions (e.g. radially and in the peripheral direction), so that it is possible to read off a first degree of deformation $$\varphi_1 \left( = \ln \frac{l_1}{d_0} \right)$$

and a second degree of deformation $$\varphi_2 \left( = \ln \frac{b_1}{d_0} \right).$$

Since the degree of deformation in the direction of the foil thickness cannot be determined by using the measuring grid process, it is determined by using the constancy of volume ($\phi_1 + \phi_2 + \phi_3 = 0$).

During the process of stamping the smooth blank to produce the structure, a plastic flow usually occurs in the material, the origin of which lies in the different stress states caused by the deformation. However, the plastic flow of material is only possible if the blank being used has a high refractive index or has partial sections which have a thicker construction and/or are only to be deformed to a small degree and which serve as a "reservoir of material". However, the metal foils, which are used in particular to produce a catalyst carrier body for an exhaust system of an internal combustion engine, have foil thicknesses of less than 0.065 mm, in particular less than 0.03 mm, and a relatively high aluminum content. This means that the metal foil being used does not have either a high elongation at break (due to the aluminum content) or "reservoirs of materials" (due to the small foil thickness). The production process proposed, with an approximately uniform degree of deformation in an inner boundary region and an outer boundary region of the metal foil, substantially prevents the flow of material. At the least, the flows of material are not sufficiently great for the foil thickness to be significantly reduced or even for a crack to be produced in the metal foil.

In accordance with another mode of the invention, the structure is imparted in such a way that a distance from the inner edge to the outer edge of the blank approximately corresponds to a distance from the outer contour to the inner contour of the metal foil. The structure being imparted is generally regular in nature. The result thereof is that the dimensions of the inner edge and of the outer edge of the blank are reduced by substantially the same factor during the deformation process. In order to obtain degrees of deformation which are as uniform as possible in an inner and outer region of the metal foil, it is advantageous in this context to keep the distance between the inner and outer edges of the blank approximately constant even during and after the deformation process. In this way, the radial flow of material is substantially reduced.

In accordance with a further mode of the invention, it is advantageous to generate a structure in wave form which has a predeterminable wave height and a predeterminable wave length. This structure in wave form is very regular in configuration and avoids very extensive bending stresses or creasing loads in the blank. This also makes it possible to achieve a particularly uniform degree of deformation.

In accordance with an added mode of the invention, with regard to the structure in wave form described above, it is advantageous for the structure in the inner boundary region and in the outer boundary region to be provided with an approximately identical wave height, whereas the wave length is shorter in the inner boundary region than in the outer boundary region. In this context, the term wave length is to be understood as meaning the distance between two adjacent formations of the structure in a direction perpendicular to the plane of the blank. The wave height relates to the distance between two directly adjacent, opposite extremes of the formation. In this case, the degrees of deformation in the inner boundary region and in the outer boundary region are equalized by varying or adjusting the wave length.

In accordance with an additional mode of the invention, the inner contour and outer contour as well as the inner edge and outer edge are constructed to be round and concentric with respect to one another. This very regular configuration of the edges or contours prevents an irregular load (e.g. a notch effect) of the material during the deformation process.

In accordance with yet another mode of the invention, the structure is produced with the aid of a multi-stage tool, in particular using a multi-stage wave-stamping tool, with the structure being only partially produced at each stage. This means that the degree of deformation which is ultimately to be produced is generated in a plurality of steps. This can be effected, for example, by initially using wave-stamping tools which have a structure with relatively shallow formations. Accordingly, in a subsequent step, a wave-stamping tool which has a slightly more pronounced structure is used, while a final, third wave-stamping operation generates the wave height or wave length that is ultimately desired.

In accordance with yet a further mode of the invention, a first periphery of the inner edge and a second periphery of the outer edge of the blank are each constructed to be larger by a shortening factor than a third periphery of the inner contour and a fourth periphery of the outer contour. This shortening factor is selected as a function of the structure which is to be produced. In this case, the shortening factor, based on the outer edge or outer contour, is different than the shortening factor with regard to the inner edge or inner contour. With regard to a structure in wave form, the shortening factor is advantageously 1.1 to 1.6, in particular 1.25 to 1.45. These shortening factors have proven particularly suitable for ensuring a uniform deformation of the metal foil in the inner boundary region and in the outer boundary region.

The meaning of the shortening factor will now be explained on the basis of an example, in order to improve the clarity of the explanations. Accordingly, the blank has a first circumference, delimiting the hole, of 60 mm and a second circumference of 100 mm, and accordingly forms an annular disk. With an identical shortening factor with respect to the inner and outer edges or contours of 1.4, the finished metal foil on the inner side has a third circumference of approximately 42.86 mm and an outer fourth circumference of approximately 71.43 mm. However, this means that the distance within the blank in this example is approximately 12.73 mm, whereas with exclusive "shrinking" of the blank the distance in the metal foil would be approximately 9.1 mm. Accordingly, this would lead to an increased flow of material, but this can be avoided in this case by using different shortening factors at the inner and outer edges or contours.

With the objects of the invention in view, there is also provided a one-piece, preferably seamless metal foil for a catalyst carrier body, comprising an interior with a hole formed therein, an inner contour delimiting the hole, an outer contour, and a structure with approximately radially running formations.

For this purpose, the metal foil has an approximately uniform degree of deformation in an inner boundary region and an outer boundary region. The preferred seamless construction of the metal foil is produced with the aid of a one-piece, annular blank. In this way, joins, which in view of thermal stresses would lead to an inhomogeneous distribution of stresses in the metal foil, are avoided in the metal foil. This is of particular importance if the metal foil is used in a catalyst carrier body which is installed in an exhaust system of an automobile. In this application, very high thermal and dynamic loads occur, and in particular a uniform thermal expansion of the metal foils is desirable.

In accordance with another feature of the invention, the formations of the structure are radially running wave peaks and wave valleys having a wave height and a wave length. The wave height in this case is preferably constant in the radial direction, whereas the wave length increases. Alternatively, it is proposed for the number of wave peaks and wave valleys in an inner boundary region to be greater than in an outer boundary region. These particular embodiments of the metal foil allow relatively uniform deformation of the metal foil, while flow of the material of the metal foil can be substantially avoided.

In accordance with a further feature of the invention, metal foils having a thickness of less than 0.065 mm, in particular between 0.015 mm and 0.03 mm, are particularly preferred.

Metal foils of this type have a relatively low surface area-specific heat capacity, making them particularly suitable for use as catalyst carrier bodies. The metal foils have to ensure that after the internal combustion engine has started, a sufficiently high temperature of the catalytically active surface is reached as quickly as possible and the catalytic reaction is commenced as quickly as possible.

In accordance with an added feature of the invention, the structure is constructed with a microstructure. The microstructure is used, for example, to reinforce the structure or to swirl up a gas stream if these metal foils are used for a catalyst carrier body. The microstructure in particular has a structure height which is smaller than the wave height of the structure by approximately a factor of 0.05 to 0.2. With regard to the swirling up of the exhaust gas, it is particularly advantageous if the microstructure runs at an angle with respect to the orientation of the formations belonging to the structure.

In accordance with an additional feature of the invention, the metal foil is substantially planar. In terms of manufacturing technology, this ensures particularly simple handling and if appropriate a very compact catalyst carrier body as well.

With the objects of the invention in view, there is also provided a honeycomb body, in particular for purifying an exhaust gas from an internal combustion engine. The honeycomb body comprises a central passage having an incoming flow axis, and a multiplicity of one-piece metal foils each disposed substantially parallel to a plane, preferably perpendicular to the incoming flow axis. The metal foils are at least partially formed with a structure defining passages through which a gas can flow. The structure has approximately radially running formations.

The metal foils have been produced in particular by using the proposed process and accordingly preferably do not have any joins. The one-piece metal foils simplify the production of catalyst carrier bodies which are distinguished by a particularly low pressure drop due to the radially running formations belonging to the structure.

In accordance with another feature of the invention, there are provided smooth, annular metal disks, which preferably have elevations and/or openings, and are disposed between the metal foils. The elevations and/or openings may additionally be disposed on or in the metal foils. These elevations and/or openings are used, for example, to swirl up an exhaust gas flowing through the honeycomb body and to exchange partial gas streams between the adjacent passages. The catalytic activity of the honeycomb body can be significantly improved in this way.

In accordance with a concomitant feature of the invention, the passage density close to the central passage is greater than 600 cpsi (cells per square inch), preferably greater than 800 cpsi, and in particular greater than 1000 cpsi. The passage density in this context refers to an imaginary area element which is disposed around the central passage. If the metal foils have a constant wave height in the radial direction, the wave length alters in the radial direction given a constant number of passages. The result of this is, for example, that the passage density in the outer boundary region is approximately 286 cpsi, whereas in the interior the passage density is 1000 cpsi.

Other features which are considered as characteristic for the invention are set forth in the appended claims.

Although the invention is illustrated and described herein as embodied in a process for producing a one-piece, structured metal foil having a hole, a metal foil and a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
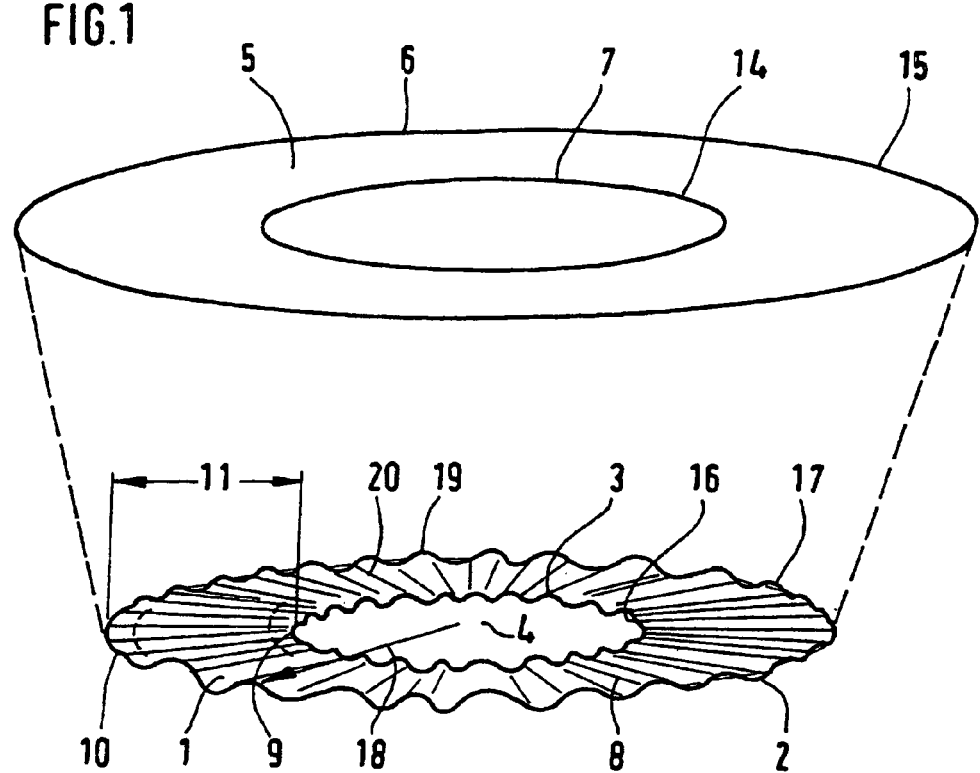
FIG. 1 is a diagrammatic, perspective view of a blank and a metal foil.

Referring now to the figures of the drawings in detail and first, particularly, to FIG. 1 thereof, there is seen a diagrammatic and perspective illustration of a blank 5 which is deformed with the aid of the proposed process to form a first embodiment of a sheet-metal foil 1 according to the invention having a hole 4 in the interior, a predeterminable, curved outer contour 2 and an inner contour 3 which delimits the hole 4. In this case, first of all, the illustrated smooth blank 5 is produced, with its outer edge 6 disposed substantially concentrically outside the predeterminable outer contour 2 of the metal foil 1 which is to be produced and its inner edge 7 disposed substantially concentrically outside the predeterminable inner contour 3 of the metal foil 1 which is to be produced. Then, a structure 8, which preferably has substantially radially running formations, is imparted to the metal foil 1. In that process, the metal foil 1 is processed with an approximately uniform degree of deformation in an inner boundary region 9 and an outer boundary region 10. A distance 11 between the boundary regions 9 and 10 is preferably kept constant during this deformation. In this case, a first circumference 14 of the inner edge 7 and a second circumference 15 of the outer edge 6 of the blank 5 are each larger by a shortening factor than a respective third circumference 16 of the inner contour 3 and a fourth circumference 17 of the outer contour 2. The shortening factors are selected as a function of the structure 8 which is to be produced. In the case of a structure having a wave form, these shortening factors are between 1.1 and 1.6. Both the blank 5 and the metal foil 1 have a one-piece body and do not have any joins.

Figure 2:
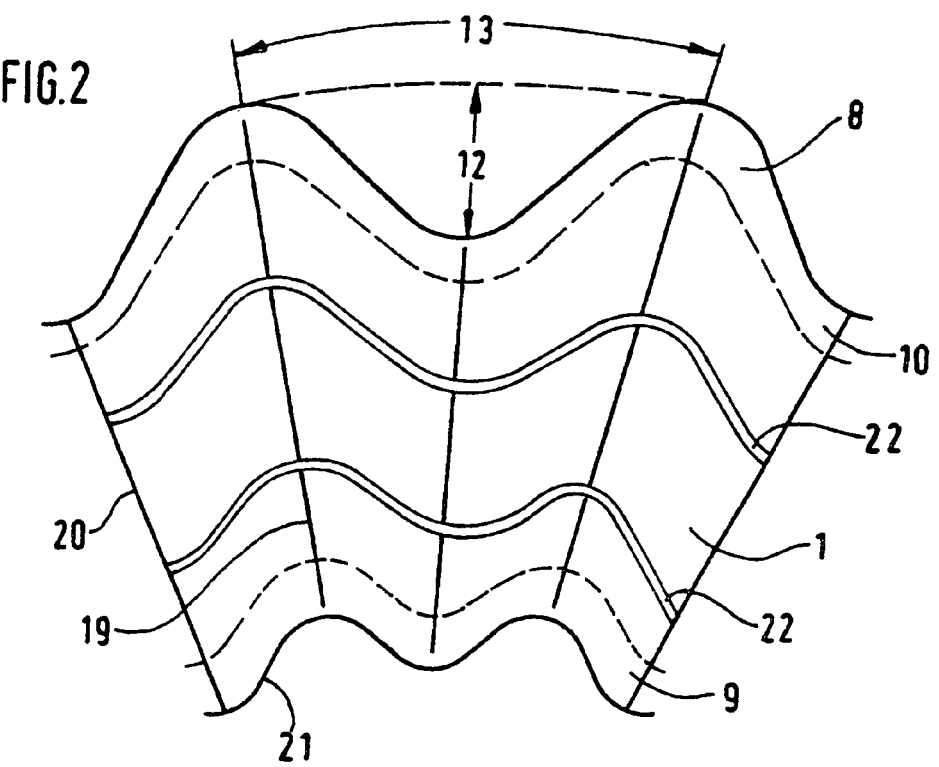
FIG. 2 is a fragmentary, elevational view of an embodiment of the metal foil.

FIG. 2 diagrammatically depicts a detailed view of an embodiment of the metal foil 1 with a structure 8 in wave form. The formations of the structure 8 in this case are radially running wave peaks 19 and wave valleys 20 with a wave height 12 and a wave length 13. The illustrated embodiment of the metal foil 1 has a constant wave height 12 in the direction of a radius 18, whereas the wave length 13 increases. A ratio of wave length 13 to wave height 12 in an outer boundary region 10 in this case is lower by at least a ratio factor of 0.3 than a corresponding ratio in an inner boundary region 9. The metal foil 1 is constructed with a foil thickness 21 of less than 0.05 mm, with the structure 8 being crossed by a microstructure 22.

Figure 3:
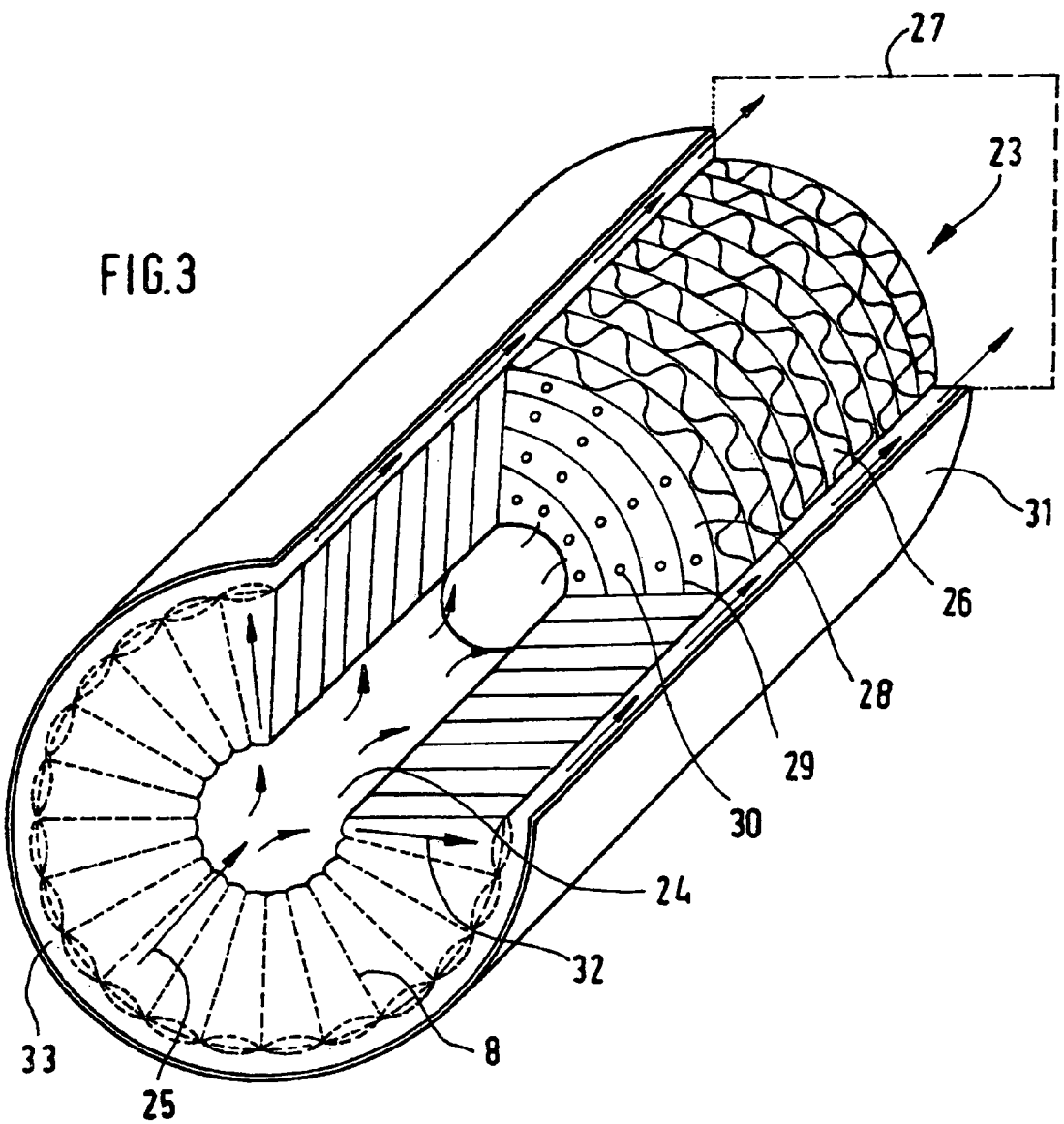
FIG. 3 is a perspective view of an embodiment of a honeycomb body according to the invention.

FIG. 3 shows a diagrammatic and perspective illustration of a honeycomb body which is suitable, in particular, for purifying an exhaust gas from an internal combustion engine. The honeycomb body 23 includes a central passage 24 with an incoming flow axis 25 and a multiplicity of metal foils 1, which are at least partially structured in such a way that they form passages 26 through which an exhaust gas can flow. In this case, the metal foils 1 have a one-piece form and are in each case disposed substantially parallel to a plane 27, preferably perpendicular to the incoming flow axis 25. They have a structure 8 with formations 19 and 20 which run approximately in the direction of a radius 18. The honeycomb body 23 is surrounded by a housing 31 which substantially delimits flow paths that are indicated by the arrows.

Smooth, annular metal disks 28 which have elevations 29 and openings 30 are disposed between the metal foils 1. It is preferable for the metal foils 1 to also have openings 30 and/or elevations 29 of this type or the microstructures 22. In this case, the elevations 29 are constructed, for example, as an encircling microstructure 22. Adjacent metal foils 1 and metal disks 28 in this case delimit the passages 26. The surfaces of the passages 26 may, for example, be provided with a catalytically active coating and can therefore be used to convert pollutants in the exhaust gas. The exhaust gas to be purified in this case flows parallel to the incoming flow axis 25 into the central passage 24 and then through a multiplicity of the passages 26 radially outward in flow direction 32 until it reaches an annular gap 33, from where it flows onward to a non-illustrated outlet. In this case a passage density close to the central passage 24 is at least 800 cpsi. The illustrated honeycomb body 23 is distinguished by an extremely low pressure loss in the exhaust-gas stream.

Figure 4:
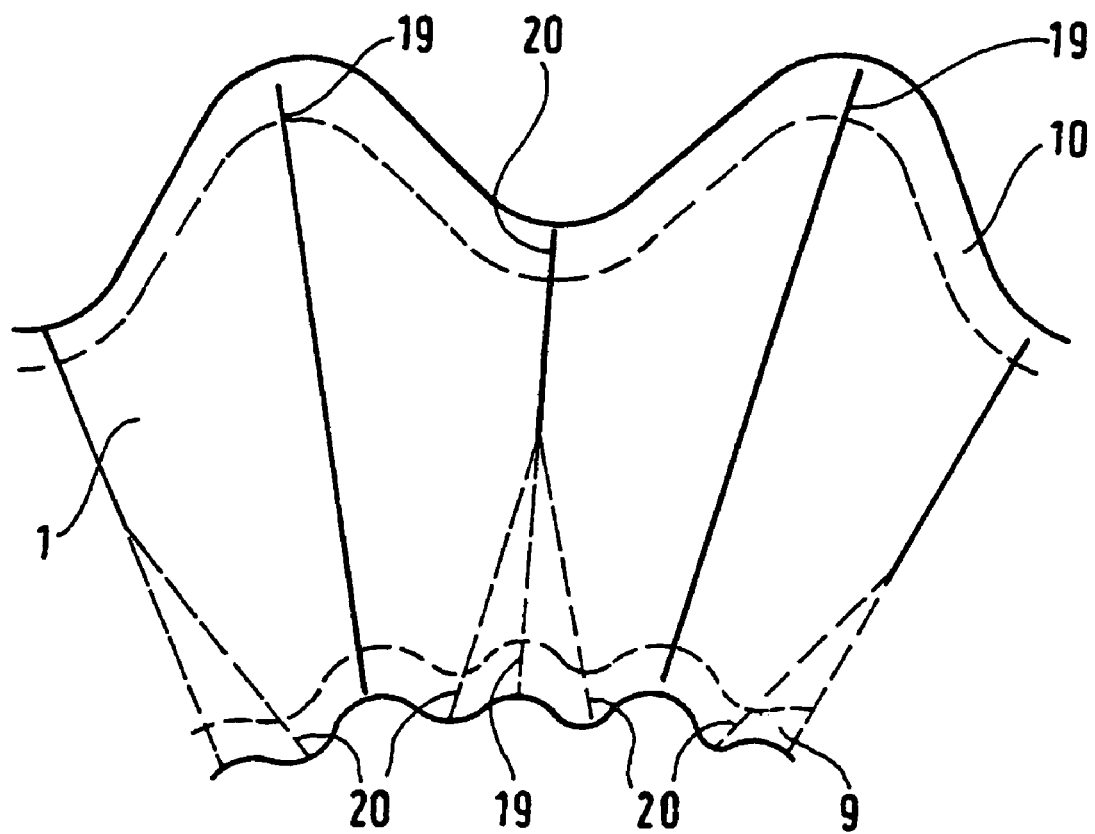
FIG. 4 is a view similar to FIG. 2 of a further embodiment of the metal foil.

FIG. 4 diagrammatically depicts a detailed view of a further embodiment of the metal foil 1. This embodiment is distinguished by the fact that the number of wave peaks 19 and wave valleys 20 is greater in an inner boundary region 9 than in an outer boundary region 10. With the aid of a correspondingly configured wave-stamping tool, an additional wave peak 19 is generated in a wave valley 20, so that an additional wave peak 19 is produced on the radially inner side between two wave peaks 19 in the inner boundary region 9.

With the aid of the process according to the invention and the metal foil according to the invention, it is possible to produce honeycomb bodies, in particular as catalyst carrier bodies, which are particularly simple to produce in terms of manufacturing technology and are distinguished by a very low pressure drop.

We claim:

1. A metal foil for a catalyst carrier body, comprising:
   a seamless one-piece body having:
   an interior with a hole formed therein;
   an inner contour delimiting said hole;
   an outer contour; and
   a structure with radially running wave peaks and wave valleys extending from said inner contour to said outer contour, said wave peaks and said wave valleys having a wave height being constant in radial direction and having a wave length increasing in radial direction.

2. The metal foil according to claim 1, wherein said body has an inner boundary region and an outer boundary region, and said inner boundary region has more of said wave peaks and said wave valleys than said outer boundary region.

3. The metal foil according to claim 1, wherein said body has a foil thickness of less than 0.065 mm.

4. The metal foil according to claim 1, wherein said body has a foil thickness of between 0.015 mm and 0.03 mm.

5. The metal foil according to claim 1, wherein said structure is constructed with a microstructure.

6. The metal foil according to claim 1, wherein said body is substantially planar.

7. A configuration for a catalyst carrier body, comprising:
   a seamless one-piece metal foil body having
   an interior with a hole formed therein;
   an inner contour delimiting said hole;
   an outer contour; and
   a structure with radially running wave peaks and wave valleys, said wave peaks and said wave valleys having a wave height being constant in radial direction and having a wave length increasing in radial direction.

* * * * *